United States Patent
Monroe

(10) Patent No.: US 9,792,035 B2
(45) Date of Patent: Oct. 17, 2017

(54) SYSTEM AND METHOD FOR PAYMENT USING A MOBILE DEVICE

(71) Applicant: Joshua Monroe, Wentzville, MO (US)

(72) Inventor: Joshua Monroe, Wentzville, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 671 days.

(21) Appl. No.: 13/647,560

(22) Filed: Oct. 9, 2012

(65) Prior Publication Data

US 2014/0099886 A1    Apr. 10, 2014

(51) Int. Cl.
*G06Q 20/00* (2012.01)
*G06F 3/0487* (2013.01)
*G06Q 20/32* (2012.01)

(52) U.S. Cl.
CPC ....... *G06F 3/0487* (2013.01); *G06Q 20/3223* (2013.01)

(58) Field of Classification Search
CPC ............ G06Q 20/00; H04Q 7/24; G06F 3/01
USPC .......................................................... 705/39
See application file for complete search history.

(56) References Cited

U.S. PATENT DOCUMENTS

| | | |
|---|---|---|
| 2007/0140199 A1* | 6/2007 | Zhao et al. .................. 370/338 |
| 2010/0013762 A1 | 1/2010 | Zontrop et al. |
| 2012/0240150 A1 | 9/2012 | Low et al. |
| 2012/0252359 A1 | 10/2012 | Adams et al. |
| 2012/0252360 A1 | 10/2012 | Adams et al. |

FOREIGN PATENT DOCUMENTS

CA    EP2506204 A1 *    3/2011    ............ G06Q 20/00

* cited by examiner

*Primary Examiner* — Clifford Madamba
(74) *Attorney, Agent, or Firm* — Leason Ellis LLP

(57) ABSTRACT

A system and method is disclosed for a contactless payment enabled smartphone in which a user can toggle between multiple payment methods, i.e. multiple different credit/debit card accounts, by predefined user actions, alone or in combination with the act of changing the physical orientation of the smartphone, and complete a payment transaction using the selected payment method via a contactless, wireless transmission.

10 Claims, 3 Drawing Sheets

100

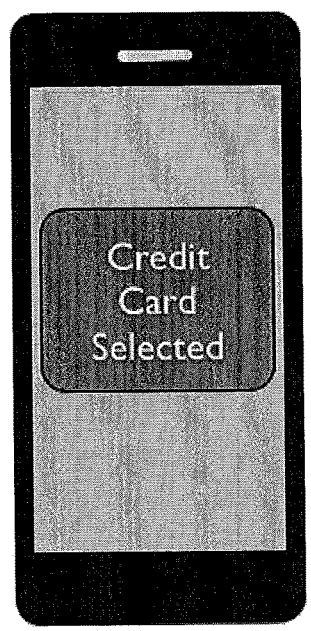
FIG. 4-A  FIG. 4-B

SYSTEM AND METHOD FOR PAYMENT USING A MOBILE DEVICE

TECHNICAL FIELD OF THE INVENTION

This patent application relates generally to the field of electronic transactions and, in particular, wireless electronic devices configured to select a payment method and wirelessly transmit payment information.

BACKGROUND OF THE INVENTION

Many individuals carry cash currency, debit cards or credit cards to complete daily purchases. A more modern payment method for completing debit/credit transactions is a "contactless" payment transaction, such as can be done using with PayPass® by MasterCard International Incorporated, the assignee of the present invention. That system provides cardholders with a simpler way to complete a credit/debit transaction by bringing a contactless-enabled payment card or other payment device, such as a key fob, within proximity of a point-of-sale terminal reader, rather than swiping or inserting a card.

Contactless payment generally employs "Near Field Communication" (NFC) technology, which facilitates secure, short range communication between electronic devices. More specifically, NFC is a short range high frequency wireless communication technology that enables the exchange of data between devices over a relatively short distance. NFC is based on Radio Frequency Identification ("RFID") technology and uses many of the same working principles.

NFC is a set of short-range wireless technologies, typically requiring a distance of 4 cm or less. Typically, NFC involves an initiator and a target; the initiator actively generates an RF field that can power a passive target. This enables NFC targets to take very simple form factors such as tags, stickers, key fobs, or cards that do not require batteries. NFC peer-to-peer communication is possible, provided both devices are powered.

NFC tags contain data and are typically read-only, but can be rewriteable. The tags can securely store personal data, such as debit and credit card information, loyalty program data, PINs and networking contacts, among other information.

NFC tags for contactless payment have only added to the number of devices that users carry on a day to day basis, including cash, credit cards, keys, NFC tags, and mobile phones/smartphones. In an effort to consolidate the myriad of electronic devices used on a daily basis, some mobile phones now include wireless transponders, including but not limited, to NFC tags.

With the rising popularity of NFC equipped mobile phones, more consumers are completing contactless payment transactions using their mobile phones instead of the traditional wireless payment key fobs. In addition, "mobile wallet" applications on a smart phone allow the user to select one of multiple stored cards in order to make a payment as many consumers use more than one card in a given day. However, with mobile phones acting as payment devices, selecting a particular card often involves awaking the phone from sleep, unlocking the phone, launching the mobile wallet application, selecting the card and then tapping the phone to the terminal. This is a lengthy process that ultimately can hinder the use of these technologies. When faced with a lengthy multi-step process of selecting a card on their phone or simply pulling the desired card out of their physical wallet, the consumer may prefer to reach for their old physical wallet and card.

It would be beneficial to provide a mobile phone and/or smartphone configured to allow a user to toggle between multiple payment methods and complete a wireless/contactless payment transaction quickly, easily and without requiring multiple user input actions.

It is with respect to these and other considerations that the disclosure made herein is presented.

SUMMARY OF THE INVENTION

Technologies are presented herein in support of a system and method to facilitate wireless payment transactions. In particular, a wireless communication device is configured to select a payment method and to wirelessly transmit payment information without unlocking a phone or other electronic device. In one implementation, a payment is selectable as a function of a predefined (e.g., manual) user action/interaction. In another further implementation, the payment selector further takes into consideration the angular position of the communication device.

According to a first aspect, a wireless communication device is disclosed. Particularly, a wireless communication device adapted to conduct a financial transaction over a communication network of the type having one or more processors configured to interact with a wireless transceiver, an angle sensor, and a computer readable storage medium wherein the one or more processors execute one or more software modules stored on the storage medium. The device includes a payment details module configured to receive one or more sets of payment information and associate the one or more sets of payment information with the two or more angular positions. The device also includes a payment module configured to transmit payment information obtained from the payment details module in response to a particular angular position provided by the angle sensor and a manual user action, wherein the payment details are selected automatically as a function of the angular position of the wireless communication device at the time of the manual user action.

According to another aspect, a method for conducting a financial transaction over a communication network using a wireless communication device is provided. The method comprises: receiving one or more sets of payment information and associating the one or more sets of payment information with the two or more angular positions of the wireless device, receiving a manual user action, and transmitting payment information in response to the particular angular position provided by the angle sensor and a manual user action. In this method, the payment details are selected automatically as a function of the angular position of the wireless device at the time of the manual user action.

According to another aspect, a wireless communication device is disclosed. Particularly, the wireless communication device is adapted to conduct a financial transaction over a communication network and is of the type that has one or more processors configured to interact with a wireless transceiver, and a user interface, a computer readable storage medium, wherein the one or more processors execute one or more software modules stored on the storage medium. The device includes a payment details module configured to receive one or more sets of payment information and associate the one or more sets of payment information with one or more predefined user interactions with the user interface. The device also includes a payment module configured to transmit payment information obtained from the payment details module in response to a particular predefined user interaction with the user interface wherein the payment details are selected automatically as a function of the predefined user interaction.

According to another aspect, a method for conducting a financial transaction over a communication network using a wireless communication device is provided. The method comprises: receiving one or more sets of payment information, associating the one or more sets of payment information with one or more predefined user interactions, receiving a user action, and transmitting payment information in response to the user action. In this method, the payment details are selected automatically as a function of the user action.

These and other aspects, features, and advantages can be appreciated from the accompanying description of certain embodiments of the invention and the accompanying drawing figures and claims.

BRIEF DESCRIPTION OF THE DRAWINGS

FIG. 4-A is a diagram illustrating an exemplary orientation of a wireless communication device; and FIG. 4-B is a diagram illustrating an exemplary orientation of a wireless communication device.

DETAILED DESCRIPTION OF CERTAIN
EMBODIMENTS OF THE INVENTION

By way of overview and introduction, a system and method is disclosed for a contactless, payment-enabled smartphone in which a user can toggle between multiple payment methods, i.e., multiple different credit/debit card accounts, by changing the physical orientation of the smartphone and complete a transaction using the selected payment method via a contactless, wireless transmission.

It can be appreciated that, from the consumer's standpoint, that there is a demand for a system that removes the inconvenience of carrying credit cards and contactless payment key fobs in addition to carrying a smartphone, and for a solution that reduces the input required from the user to select one of a plurality of payment methods in order to conduct a transaction using a contactless, payment enabled-smartphone.

The referenced systems and methods are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms, as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods. Accordingly, aspects of the present systems and methods can take the form of an entirely hardware embodiment, an entirely software embodiment (including firmware, resident software, micro-code, etc.), or an embodiment combining software and hardware. One of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer. Furthermore, the teems and phrases used herein are not intended to be limiting, but rather are to provide an understandable description of the systems and methods.

Figure 1:
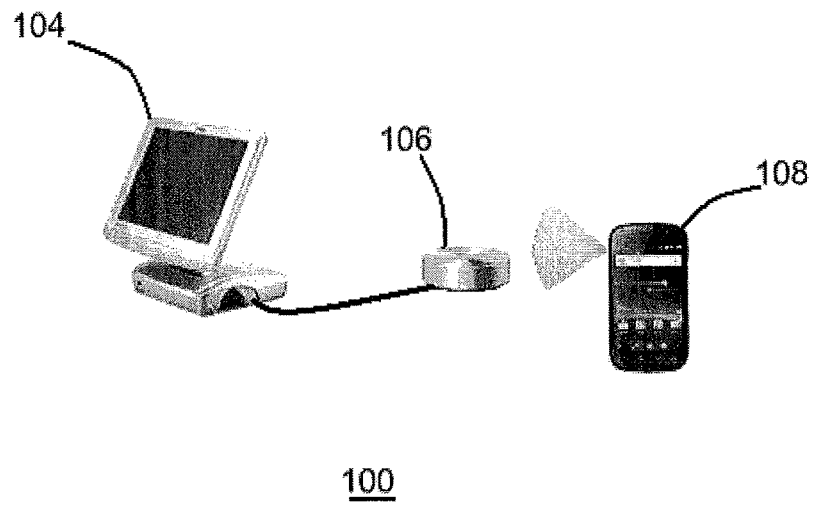
FIG. 1 is a high-level diagram illustrating an exemplary configuration of a wireless transaction processing system.

FIG. 1 is a high level diagram illustrating an exemplary contactless transaction processing system 100. The system consists of a point of sale (POS) system 104 equipped with a wireless transceiver 106, and a wireless communication device 108 adapted to select a payment method and conduct a contactless financial transaction according to the present invention. POS systems that are enabled to receive and/or transmit transaction information wirelessly by contactless payment methods are well known in the art. Similarly, wireless communication devices that are enabled to transmit and receive transaction information, including payment information, wirelessly through contactless payment methods are well known in the art.

In the exemplary wireless transaction processing system 100 of FIG. 1, the POS system 104 is operated by a merchant for processing transactions for goods or services. Wireless communication device 108 can be a mobile phone or a smartphone and is operated by a user/consumer. When a transaction is ready to be completed, the consumer is prompted to conduct a contactless payment transaction in order to submit payment. The consumer can present wireless communication device to the POS wireless transceiver 106. In this exemplary embodiment wireless transceiver can be an NFC transceiver. The wireless communication device can emulate an NFC or RFID tag so as to provide data, including personal information (i.e., name, billing address and the like) and payment information (i.e., credit card number, expiration date and security code) to the POS system via the POS wireless transceiver.

NFC wirelessly operates over a short range, typically under about 4 cm. NFC may operate in various modes such as, for example, Card Emulation Mode, Peer-to-Peer Mode, and Reader-Writer Mode. Card Emulation Mode permits the wireless communication device to be used to perform secure transactions such as mobile payments, including smart card like transactions. Peer-to-Peer Mode permits data transfer between two NFC devices in proximity to one another for services as diverse as mobile ticketing transactions and exchange of business cards. Reader-Writer Mode permits a one-way data acquisition of information.

In addition, the wireless communication device can also read a NFC tag or RFID tag to acquire information such as, for example, transaction, payment or merchant related information. For RFID tag reading and emulation, a communication interface within the wireless communication device may be configured for operating at a suitable radio frequency and includes an antenna suitable for inductively coupling at one or more RF frequencies with an RFID reader. The term "NFC" as used herein is a broad term which is inclusive of RFID but is not essentially defined by RFID. In this sense, a RFID tag may be considered a type of NFC tag, but a NFC tag does not require the particular attributes of a RFID tag. Similarly, a RFID reader may be considered to be a type of NFC reader, but a NFC reader does not require the ability to read RFID tags. Further, although the exemplary embodiments described herein are discussed in relation to NFC wireless payment systems, it should be understood that the present invention can facilitate wireless transmission of payment data over other wireless communication systems including but not limited to, Bluetooth, WIFI, cellular and the like.

It should be noted that while FIG. 1 depicts credit transaction processing system 100 with respect to a wireless communication device 108 and a merchant POS system 104, it should be understood that any number of wireless communication devices and merchant POS systems can interact with one another in the manner described herein. It should be further understood that while the various electronic devices and machines referenced herein, including but not limited to merchant POS system and wireless communication device, are referred to herein as individual/single devices and/or machines, in certain implementations the referenced devices and machines, and their associated and/or accompanying operations, features, and/or functionalities can be arranged or otherwise employed across any number of devices and/or machines, as is known to those of skill in the art.

Figure 2:
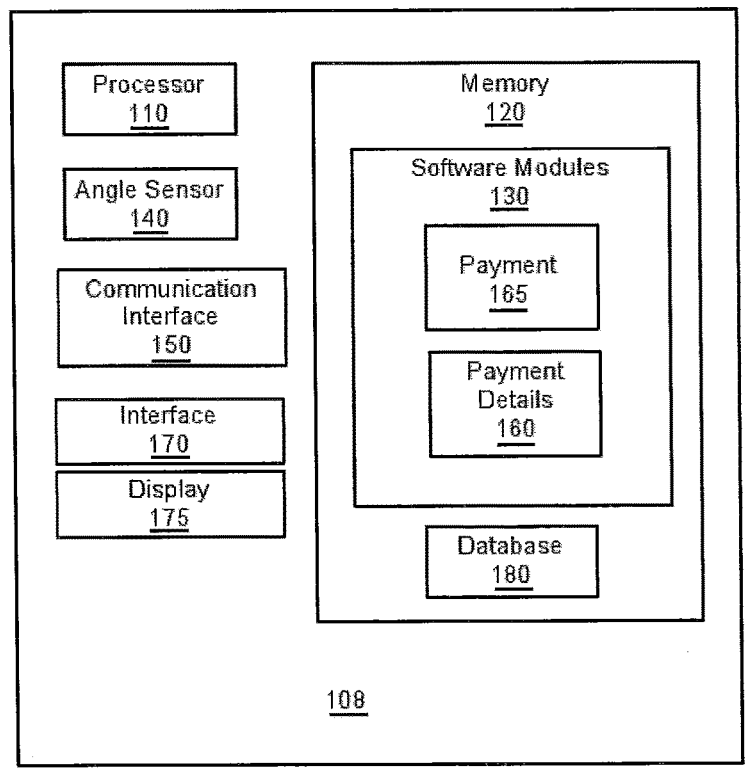
FIG. 2 is a block diagram illustrating an exemplary configuration of a wireless communication device according to an embodiment of the present invention.

FIG. 2 is a block diagram illustrating an exemplary configuration of a wireless communication device 108 according to an embodiment of the present invention. Wireless communication device includes, various hardware and software components that serve to select a payment method and conduct a financial transaction according to the present invention. Wireless communication device includes, inter alia, a processor 110 in communication with a memory 120, an angle sensor 140 and a communication interface 150. Processor serves to execute software instructions that can be loaded into memory 120. Processor 110 can be a number of processors, a multi-processor core, or some other type of processor, depending on the particular implementation.

Preferably, memory 120 is accessible by processor 110, thereby enabling processor to receive and execute instructions stored on memory. Memory can be, for example, a random access memory (RAM) or any other suitable volatile or non-volatile computer readable storage medium. In addition, memory can be fixed or removable and can contain one or more components or devices such as a hard drive, a flash memory, a rewritable optical disk, a rewritable magnetic tape, or some combination of the above.

The angle sensor 140 is also operatively connected to processor. Angle sensor can be any type of sensor that detects an angular position and generates an electric signal indicative of the physical orientation of the wireless communication device. Angle sensors are well known smartphone components and can include, but are not limited to accelerometers, gyroscopes, compasses and the like.

One or more software modules 130 are encoded in memory 120. The software modules can comprise one or more software programs or applications having computer program code or a set of instructions executed in processor 110. Such computer program code or instructions for carrying out operations for aspects of the systems and methods disclosed herein can be written in any combination of one or more programming languages.

Preferably, included among the software modules are payment details module 160 and payment module 165 that are executed by processor. During execution of the software modules, the processor configures the wireless communication device to perform various operations relating to the facilitating and processing of transactions, as will be described in greater detail below.

In addition, it should be noted that other information and/or data relevant to the operation of the present systems and methods (such as database 180) can also be stored on memory, as will be discussed in greater detail below.

Also preferably stored in memory is database 180. Database 180 contains and/or maintains various data items and elements that are utilized throughout the various operations of contactless payment system. The information stored in database can include but is not limited to, credit card details and billing information unique to the consumer and/or payment method, personal information for each consumer, banking information and a history of transactions by the consumer. It should be noted that although database 180 is depicted as being configured locally to wireless communication device 108, in certain implementations database and/or various of the data elements stored therein can be located remotely (such as on a remote device or server—not shown) and connected to wireless communication device 108 through a network in a manner known to those of ordinary skill in the art, in order to be loaded into a processor and executed.

It can also be said that the program code of software modules 130 and one or more computer readable storage devices (such as memory 120 and/or storage 190) form a computer program product that can be manufactured and/or distributed in accordance with the present invention, as is known to those of ordinary skill in the art.

Communication interface 150 is also operatively connected to the processor 110 and can be any interface that enables communication between the wireless communication device and external devices, machines and/or elements including a merchant's POS system. Preferably, communication interface includes an NFC transceiver that is configured to operate at a suitable radio frequency, includes an antenna suitable for inductively coupling at one or more RF frequencies with an RFID reader and is capable of transmitting and/or receiving data. Alternatively, communication interface can include but is not limited to a Bluetooth, or cellular transceiver, a satellite communication transmitter/receiver, an optical port and/or any other such interfaces for wirelessly connecting electronic device 108 to a merchant's POS system.

An interface 170 is also operatively connected to the processor. The interface can be one or more input device(s) such as switch(es), button(s), key(s), a touch screen, etc. Interface serves to facilitate the capture of certain information about the user and payment methods, such as credit card numbers and billing information, as discussed in greater detail below. Interface also serves to facilitate the capture of commands from the user such as an on-off commands or settings related to operation of the contactless payment system.

A display 175 is also operatively connected to the processor. Display includes a screen or any other such presentation device that enables the user to view various options, parameters, and results. By way of example, display 175 can be a digital display such as a dot matrix display or other 2-dimensional display.

By way of further example, interface 170 and display 175 can be integrated into a touch screen display. Accordingly, the screen is used to show a graphical user interface, which can display various data and provide "forms" that include fields that allow for the entry of information by the user. Touching the touch screen at locations corresponding to the display of a graphical user interface allows the person to interact with the device to enter data, change settings, control functions, etc. So, when the touch screen is touched, interface communicates this change to processor, and settings can be changed or user entered information can be captured and stored in the memory.

The operation of the wireless communication device 108 and the various elements and components described above will be further appreciated with reference to the method for selecting a payment method and conducting a financial transaction over a communication network using a wireless communication device as described below, in conjunction with FIG. 3.

Figure 3:
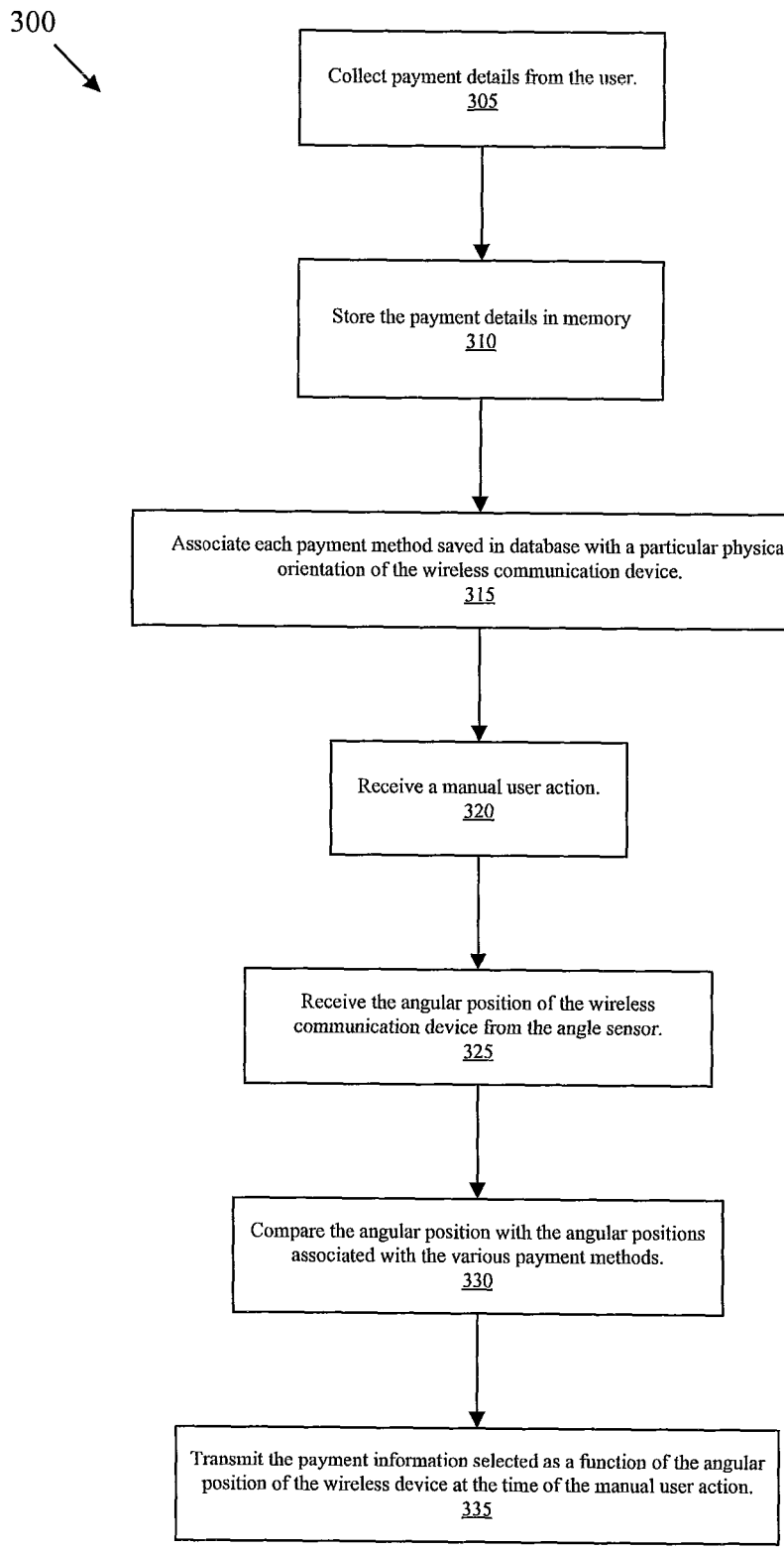
FIG. 3 is a flow diagram showing a routine that illustrates facilitating a transaction according to an embodiment of the present invention.

Turning now to FIG. 3, a flow diagram illustrates a routine 300 for selecting a payment method and facilitating a wireless payment in accordance with at least one embodiment disclosed herein. It should be appreciated that several of the logical operations described herein are implemented (1) as a sequence of computer implemented acts or program modules running on wireless communication device 108; and/or (2) as interconnected machine logic circuits or circuit modules within the wireless communication device. The implementation is a matter of choice dependent on the requirements of the device (e.g., size, energy, consumption, performance, etc.). Accordingly, the logical operations described herein are referred to variously as operations, steps, structural devices, acts, or modules. As referenced above, various of these operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

The process begins at step 305, in which processor 110 executing one or more software modules 130, including, preferably, payment details module 160, configures wireless communication device 108 to collect payment details from a user of the system. Wireless communication device 108 can be a smartphone as described in detail above. The display 175 of the wireless communication device 108, such as a smartphone, can display one or more interactive forms for inputting information including but not limited to a form for inputting a credit card number, a billing address associated with that card and personal information for security purposes. Alternatively, payment details can be obtained in other ways such as through electronic access to the details kept on another device, via a camera image of the debit card or credit card, and so on. Using user interface 170, the user can input a variety of different payment methods for completing transactions. For example, a user can enter a personal credit card as a first payment method and a personal debit card as a second payment method. While this exemplary embodiment describes two possible payment methods, it should be understood that the present invention can accommodate any number of payment methods. Further, payment methods are not limited to credit/debit cards but can include, without limitation, bank accounts or other electronic money transfer methods (e.g., PayPal® by PayPal, Inc.).

At step 310, processor executing one or more software modules 130, including, preferably, payment details module 160, configures the wireless communication device 108 to store the payment methods gathered at step 305 in memory 120, and more specifically in database 180.

At step 315, processor 110 executing one or more software modules 130, including, preferably, payment details module 160, configures the wireless communication device 108 to associate each payment method saved in database, with a particular physical orientation of the wireless communication device 108. For example, the system can associate a first payment method with a generally horizontal orientation, commonly referred to as landscape, and associate a second payment method with a vertical orientation, commonly referred to as portrait. FIG. 4-A depicts a wireless communication device in a portrait orientation according to an exemplary embodiment. FIG. 4-B depicts a smartphone in a landscape orientation. While only two possible orientations in a two dimensional plane (x-y) have been mentioned, it should be understood that angle sensors, such as accelerometers, can also allow for the detection of the wireless communication device's orientation in three dimensions (x-y-z).

At step 320, processor 110 executing one or more software modules 130, configures the wireless communication device 108 to receive a manual user action. A manual user action can be any kind of user input to the wireless communication device 108 that can be interpreted as an indication that the user intends to complete a transaction using the wireless communication device 108. This can be a user input via a user interface 170, such as depressing one or more buttons a prescribed number of times (e.g., three times) or interacting with a touch screen or by a voice command to a microphone on the device. Alternatively, user action can include placing the wireless communication device in proximity of a merchant's POS system wireless transceiver 106. For example, merchant's POS system employing NFC technology can be actively generating an RF field. The detection of an RF field by the wireless communication device's communication interface 150, can be interpreted by the processor 110 as a manual user action. It should be understood that the wireless communication device 108 can be configured to receive and act upon a manual user action regardless of whether the device is in a locked or sleep state or in an unlocked or active state.

At step 325, responsive to detecting a manual user input at step 320, processor 110 executing one or more software modules 130 configures the wireless communication device 108 to receive the angular position of the wireless communication device 108 from the angle sensor 140. In an exemplary embodiment, the angle sensor 140 can be an accelerometer that generates an electric signal indicative of the physical orientation of the wireless communication device as is well known in the art. Optionally, the electric signal undergoes pre-processing to provide information that is of the same value range as used with the stored angular positions that were stored within the payment details at step 310.

At step 330, processor 110 executing one or more software modules 130, configures the wireless communication device 108 to compare the angular position received at step 320 with the angular positions associated with the various payment methods stored at step 310. If the processor determines that the angular position of the angle sensor 140 is within a pre-determined range of the angular position associated with a particular payment method, the processor 110 will set the matching payment method as the payment method to be transmitted.

At step 335, processor 110 executing one or more software modules 130, including, preferably, payment module 165, configures the wireless communication device 108 to transmit the payment information selected as a function of the angular position of the wireless communication device 108 at the time of the manual user action as determined in step 325.

Furthermore, the wireless communication device 108 can also be configured to open up a bi-directional communication link with the POS device to receive information. As mentioned above, NFC can operate in various modes. Peer-to-Peer mode permits data transfer between two NFC devices in proximity to one another for services as diverse as mobile ticketing transactions and exchange of business cards. Reader-Writer Mode permits a one-way data acquisition of information. For example, the wireless communication device 108 can acquire information such as transaction details, payment and or merchant related information. This information can be stored in the database 180 and can be used to generate a transaction history log or interface with other programs, including but not limited to, accounting/money management applications or rewards programs.

In addition, the wireless communication device 108 can be configured to enable rapid toggle between payment methods prior to completing a contactless payment transaction free of any angle sensor data. According to such an arrangement, a user can quickly toggle between a first payment method and a second payment method with two predefined user interactions with the user interface 170. For example, first payment method saved at step 310 can be set as the default payment method for contactless payment. Further, user interface 170 can include a sleep/wake push button that is commonly found on smartphones and typically pushed once to awaken the phone or force it to hibernate. The processor 110, executing one or more software modules 130, can configure the wireless communication device 108 to change the payment method to be used for contactless payment from the default first payment method to a second payment method upon detection of the user depressing the sleep/wake button twice in a set period of time. Similarly the user can toggle to a third or fourth payment method by depressing the sleep wake button three or four times within a set period of time, respectively. It should be understood that toggling between any number of payment methods can be done in this way. It should also be understood that toggling between payment methods can also be accomplished by depressing a combination of buttons, or gestures on a touch screen, or voice command, in a predefined manner. In addition, the wireless communication device 108 can be configured to allow the user to define any number of custom predefined user interactions.

At this juncture, it should be noted that although much of the foregoing description has been directed to a wireless communication device 108 configured to select a payment method and facilitate a wireless transaction and method of use, the systems and methods disclosed herein can be similarly deployed and/or implemented in scenarios, situations, and settings far beyond the referenced scenarios. It can be readily appreciated that the wireless communication device 108 can be effectively employed in practically any scenario in which a transaction is being made between one or more parties wirelessly (e.g., by 'bumping' phones). For example, two or more individuals using wireless communication devices as described herein can set their devices into a bi-directional communication mode and complete a transfer of funds between themselves simply by touching or 'bumping' phones together, allowing their respective communication interfaces to exchange the transaction data. Similarly such phone bump transfers can also be used load pre-paid credit cards and the like.

It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a method, system, and computer program product for facilitating wireless payment transactions. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should, also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A wireless communication device adapted to conduct a financial transaction over a near-field communication network, comprising:
  a non-transitory computer readable storage medium;
  a wireless near-field communication transceiver;
  an angle sensor having as an output an angular position of the wireless device;
  one or more processors configured to interact with the wireless transceiver, the angle sensor, and the storage medium;
  software modules stored on the storage medium and executable by the processor, wherein the software modules include:
    a payment details module comprising code executing in the one or more processors and configuring the one or more processors to receive two or more sets of payment information and associate the two or more sets of payment information with two or more angular positions of the wireless device; and a payment module comprising code executing in the one or more processors and configuring the one or more processors to, while the wireless device remains in a locked state:
  detect a manual user action, wherein detecting the manual user action comprises detecting, with the processor, a user press of a push-button,
  in response to the manual user action, detect a particular angular position of the wireless device provided as the output of the angle sensor,
  automatically select a particular set of payment information among the two or more sets of payment information as a function of the particular angular position of the wireless device at the time of the manual user action detection, and
  transmit the particular set of payment information using the wireless transceiver, wherein the payment module configures the processor to perform each of the above detecting, selecting and transmitting functions while the device remains in the locked state.

2. The wireless communication device of claim 1 wherein detecting the manual user action comprises: detecting, by the processor using the near-field communication transceiver, a radio frequency field emitted by a proximate device.

3. The wireless communication device of claim 1 further comprising:
  a user interface comprising a wake/sleep push-button and a touch-screen; and
  wherein the one or more processors execute code that transitions the wireless device between a sleep state and a wake state in response to actuation of the wake/sleep push-button,
  wherein the wireless device receives user inputs using the touch-screen when the wireless device is in an unlocked state and in the wake state, and
  wherein detecting the manual user action comprises: detecting a user press of the wake/sleep push-button.

4. A wireless communication device adapted to conduct a financial transaction over a near-field communication network, comprising:
  a non-transitory computer readable storage medium;
  a wireless near-field communication transceiver;
  a user interface comprising a wake/sleep push-button and a touch-screen;
  one or more processors configured to interact with the wireless transceiver, the user interface and the storage medium,
    wherein the one or more processors are configured to transition the wireless device between a sleep state and a wake state in response to actuation of the wake/sleep push-button, and
  software modules stored on the storage medium and executable by the processor, wherein the software modules include:
  a payment details module comprising code executing in the one or more processors and configuring the one or more processors to receive two or more sets of payment information and associate the two or more sets of payment information with respective predefined user interactions and with respective predefined angular positions of the wireless device, wherein each predefined user interaction is a prescribed number of actuations of the wake/sleep push-button over a prescribed period of time, and a payment module comprising code executing in the one or more processors and configuring the one or more processors to, while remaining in a locked state,
  detect one or more actuations of the wake/sleep push-button over a period of time,
  detect, with the processor using an angle sensor providing an angular position of the mobile device as an output, a particular angular position of the wireless device at the time of detecting the one or more actuations,
  compare, with the processor, the particular angular position with the predefined angular positions,
  automatically select a particular set of payment information among the two or more sets of payment information as a function of the one or more user actuations over the period of time corresponding to a predefined user interaction that is associated with the particular set of payment information and as a function of the particular angular position corresponding to a predefined angular position that is associated with the particular set of payment information, and
  transmit the particular set of payment information using the wireless transceiver, wherein the payment module configures the processor to perform each of the above detecting, comparing, selecting and transmitting functions while the device remains in the locked state.

5. A method for selecting a payment method and conducting a financial transaction over a communication network using a wireless communication device, the method comprising:
  receiving, with a processor of the wireless device from a user using an associated user interface, two or more sets of payment information;
  associating, with the processor in a non-transitory computer readable storage medium, the two or more sets of payment information with respective predefined angular positions of the wireless device; and
  while the wireless device remains in a locked state,
    detecting, with the processor using a near-field communication transceiver, a radio frequency field emitted by a proximate device,
    detecting, with the processor using an angle sensor providing an angular position of the mobile device as an output, a particular angular position of the wireless device at the time of detecting the radio frequency field,
    comparing, with the processor, the particular angular position with the predefined angular positions,
    automatically selecting a particular set of payment information among the two or more sets of payment information based on the comparison, and
    transmitting, with the processor using a near-field communication transceiver, the particular set of payment information selected.

6. The method of claim 5, further comprising the step of defining the predefined angular positions.

7. The method of claim 5, further comprising the step of receiving transaction information relating to the financial transaction.

8. A method for selecting a payment method and conducting a financial transaction over a communication network using a wireless communication device, the method comprising:
- receiving, with a processor of the wireless device and a touchscreen user interface, two or more sets of payment information input by a user using the touchscreen;
- associating, with the processor in a computer readable storage medium, the two or more sets of payment information with respective predefined user interactions and with one or more predefined angular positions of the wireless device; wherein each predefined user interaction is a prescribed number of user actuations of a wake/sleep push-button over a prescribed period of time; and
- while the wireless device remains in a locked state,
- detecting, with the processor from the wake/sleep push-button, one or more actuations of the wake/sleep push-button over a period of time,
- detecting, with the processor using an angle sensor providing an angular position of the wireless device as an output, a particular angular position of the wireless device,
- comparing, with the processor, the detected one or more actuations over the period of time with the predefined user interactions and comparing the detected angular position of the wireless device with the one or more predefined angular positions,
- automatically selecting, with the processor, a particular set of payment information among the two or more sets of payment information based on the comparisons, and
- transmitting, with the processor using a near-field communication transceiver, the particular set of payment information, wherein the above steps of detecting the one or more actuations, detecting the particular angular position, comparing, selecting, and transmitting are performed while the device remains in the locked state.

9. The method of claim 8 further comprising the step of defining the one or more predefined user interactions.

10. The wireless communication device of claim 4, further comprising an angle sensor, and wherein the payment module is configured to transmit payment information obtained from the payment details module in response to a particular predefined user interaction with the user interface and in response to a particular angular position provided by the angle sensor.

* * * * *